(12) United States Patent
Bekaert

(10) Patent No.: US 9,384,921 B2
(45) Date of Patent: Jul. 5, 2016

(54) BREAK-OFF-RESISTANT CONTROL DEVICE

(71) Applicant: Jean-Phillippe Bekaert, Montigny le Bretonneux (FR)

(72) Inventor: Jean-Phillippe Bekaert, Montigny le Bretonneux (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/402,190

(22) PCT Filed: May 21, 2013

(86) PCT No.: PCT/EP2013/001494
§ 371 (c)(1),
(2) Date: Nov. 19, 2014

(87) PCT Pub. No.: WO2013/178332
PCT Pub. Date: Dec. 5, 2013

(65) Prior Publication Data
US 2016/0005558 A1   Jan. 7, 2016

(30) Foreign Application Priority Data
May 30, 2012   (FR) ...................... 12 54956

(51) Int. Cl.
*H01H 19/14* (2006.01)
*B60K 37/06* (2006.01)
(Continued)

(52) U.S. Cl.
CPC ............. *H01H 19/14* (2013.01); *B60K 37/06* (2013.01); *G05G 1/105* (2013.01); *G05G 1/12* (2013.01); *H01H 3/10* (2013.01); *B60K 2350/102* (2013.01); *H01H 2231/026* (2013.01)

(58) Field of Classification Search
CPC ........... H01H 3/10; H01H 3/08; H01H 19/14; H01H 19/11; G05G 1/12
USPC ....... 200/336, 341, 329, 316, 314, 17 R, 520, 200/564
See application file for complete search history.

(56) References Cited

U.S. PATENT DOCUMENTS 2,189,845 A   2/1940   Terrill
2,225,594 A   12/1940  Murphy
(Continued)

FOREIGN PATENT DOCUMENTS

DE   1962560 U   6/1967
EP   0976972 A2  2/2000
(Continued)

OTHER PUBLICATIONS

International Search Report dated Jun. 18, 2013, corresponding to PCT/EP2013/001494.

*Primary Examiner* — Edwin A. Leon
(74) *Attorney, Agent, or Firm* — Young & Thompson

(57) ABSTRACT

A control device is provided including: a switch having a body and a rotary control rod extending along an axis A, the control rod being made of a plastic material, a button made of molded plastic and including an axial recess having an axis A in which the control rod is received, and an anchoring ring made from a cut and bent metal sheet, the anchoring ring being arranged around the control rod. The anchoring ring includes: first resilient plates directed counter to the body and in an oblique manner in the direction of the axis A, with a burr which abuts the rod, and second resilient plates directed toward the body and which are oriented in an oblique manner in a direction away from the axis, the second plates being in abutment with the button.

13 Claims, 3 Drawing Sheets

(51) Int. Cl.
*G05G 1/10* (2006.01)
*G05G 1/12* (2006.01)
*H01H 3/10* (2006.01)

(56) References Cited

U.S. PATENT DOCUMENTS 3,626,171 A * 12/1971 Abramowitz ........ H01H 13/023
200/314
5,391,848 A * 2/1995 Murphy ............... H01H 13/023
200/310
6,224,221 B1 5/2001 Glienicke
7,041,917 B2 * 5/2006 Tada .................... H01H 25/041
200/341

FOREIGN PATENT DOCUMENTS

| FR | 840410 A | 4/1939 |
| FR | 2991246 A1 | 12/2013 |
| JP | 2005064083 A | 3/2005 |

* cited by examiner

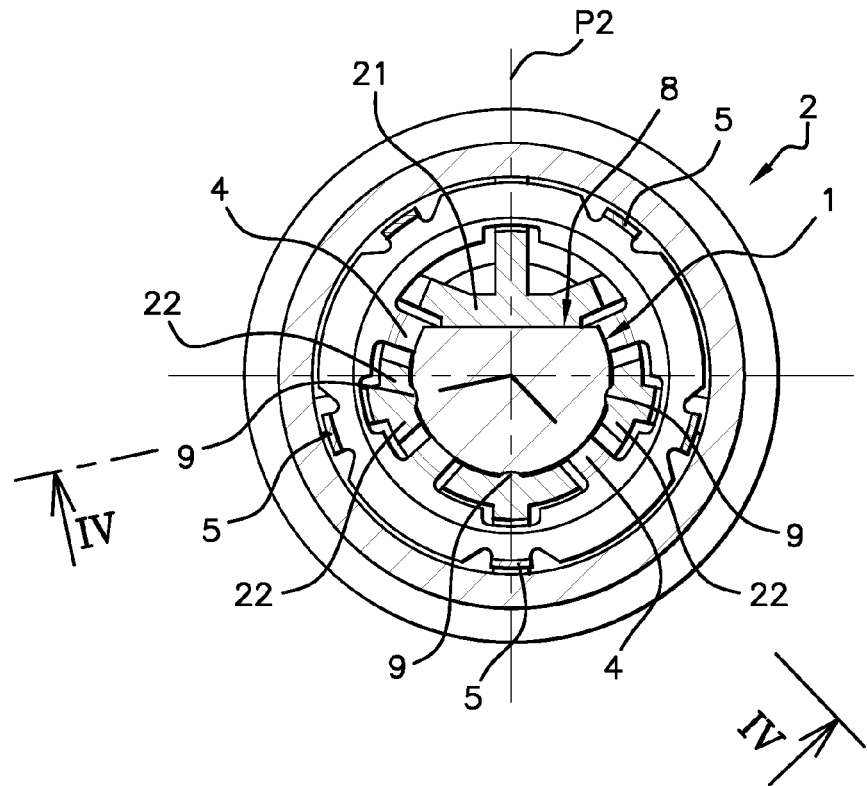
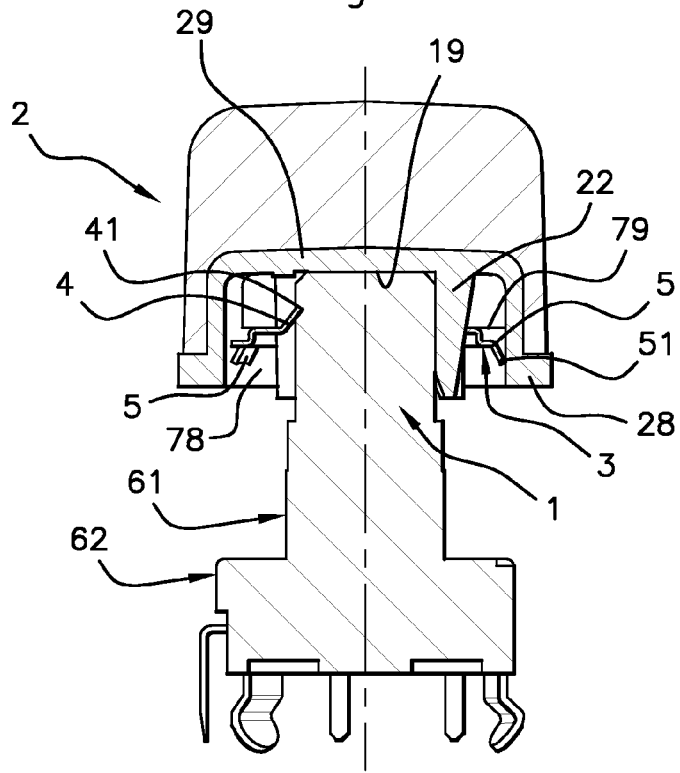

BREAK-OFF-RESISTANT CONTROL DEVICE

BACKGROUND OF THE INVENTION

1. Field of the Invention

The present invention relates to control devices with tensile strength, in particular to devices for controlling the operation of one or more members which can be gripped by a user of a motor vehicle.

More specifically, it relates to a control device which comprises a commutator which has a body and a control rod which extend along an axis A, the control rod being of plastics material and mounted with at least one degree of freedom relative to the body, and the control device comprising a molded plastics button which comprises an axial recess having a shaft A in which the control rod is at least partially received.

2. Description of the Related Art

It is known according to the prior art, for example, from document JP2005064083A, to provide a helical spring in order to clamp the button around the control rod. However, either the tensile strength of the button is insufficient or the insertion force of the button is excessively large.

BRIEF SUMMARY OF THE INVENTION

In order to overcome this disadvantage, the Applicant proposes in this instance a device which comprises an anchoring ring which is produced from sheet metal which is cut and folded, the anchoring ring being arranged around the control rod and fixed relative to the button. The anchoring ring comprises first resilient plates which are directed counter to the body and in an oblique manner in the direction of the axis A, each plate having a free end in abutment with the control rod. The anchoring ring further comprises resilient lugs which are directed toward the body and which are orientated in an oblique manner in a direction away from the axis A, the resilient lugs being in abutment with the button.

As a result of these arrangements, the tensile strength of the button by a user is great whilst the insertion force of the button is moderate. This is because the anchoring and the abutment of the first plates makes it very difficult to withdraw the button whilst in the insertion direction the resilient plates slide on the control rod. Furthermore, the assembly of the anchoring ring on the button is very easy.

In various embodiments of the invention, it is optionally possible to further use one and/or other of the following arrangements:

- the resilient lugs are advantageously second plates with a sharp edge which promotes the anchoring of the ring in the button and which makes the installation of the ring in the button easy;
- the second plates may comprise pointed pins so that the anchoring of the ring in the button is improved;
- at least one of the free ends may comprise a cutting burr which promotes the penetration of the plate into the control rod. In this manner, a withdrawal force brings about the penetration of the burr in the surface of the rod and the abutment of the plate;
- the at least one degree of freedom is a rotation about the axis A. This is the case for a rotating commutator which may or may not be able to be provided with another degree of freedom;
- the first plates and the second plates are alternated circumferentially so that the axial space required is very limited.

According to another aspect of the invention, the control rod may be substantially smooth and have a projection length from the body of less than 7 mm so that the axial projection of the button is limited.

According to another aspect of the invention, the resilient lugs may be resilient lugs which are received against a support portion of the button. In this manner, the button may be rendered detachable although the tensile force is great.

According to another aspect of the invention, the axial recess of the button may be blind. In this manner, the visible zone of the button does not comprise any joints and it is possible to use a button in one piece.

BRIEF DESCRIPTION OF THE DRAWINGS

Other aspects, objectives and advantages of the invention will be appreciated from a reading of the following description of one of the embodiments thereof, given by way of non-limiting example. The invention will also be better understood with reference to the appended drawings, in which:

FIG. 3 is a cross-section of the device along line III-III in FIG. 1, FIG. 4 is a longitudinal section of the device along line IV-IV in FIG. 3.

DETAILED DESCRIPTION OF THE PREFERRED EMBODIMENTS

Figure 1:
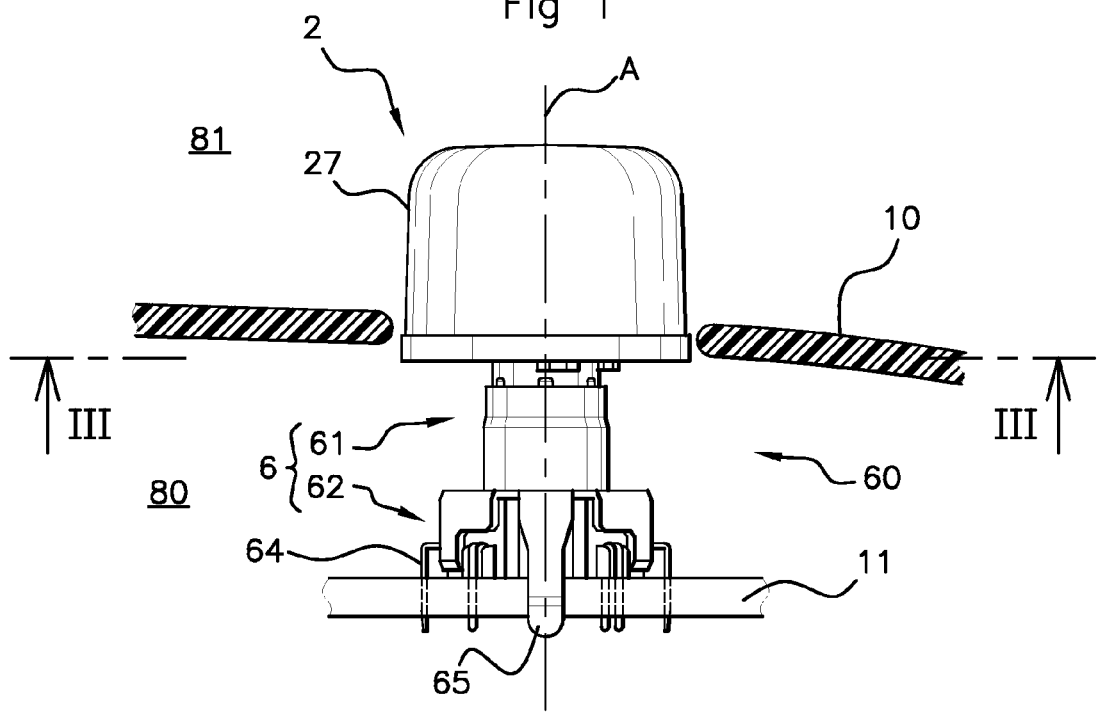
FIG. 1 is a schematic view of a control device according to the invention in a state integrated in a control assembly.

In the different Figures, the same reference numerals refer to elements which are identical or similar.

FIG. 1 shows a control assembly in which a control device according to the invention is integrated. The control assembly comprises a commutator 60 which is mounted on an electronic board 11.

A facade wall 10 separates an inner space 80 which comprises the electronic board from an outer space 81 which is called a "user space" and in which a user may be located. The user can maneuver the commutator 60 using a button 2 which protrudes from the facade wall 10 toward the user space 81.

The button 2 extends from the electronic board 11 along an axis A, which may be called the main axis of the commutator 60.

Figure 2:
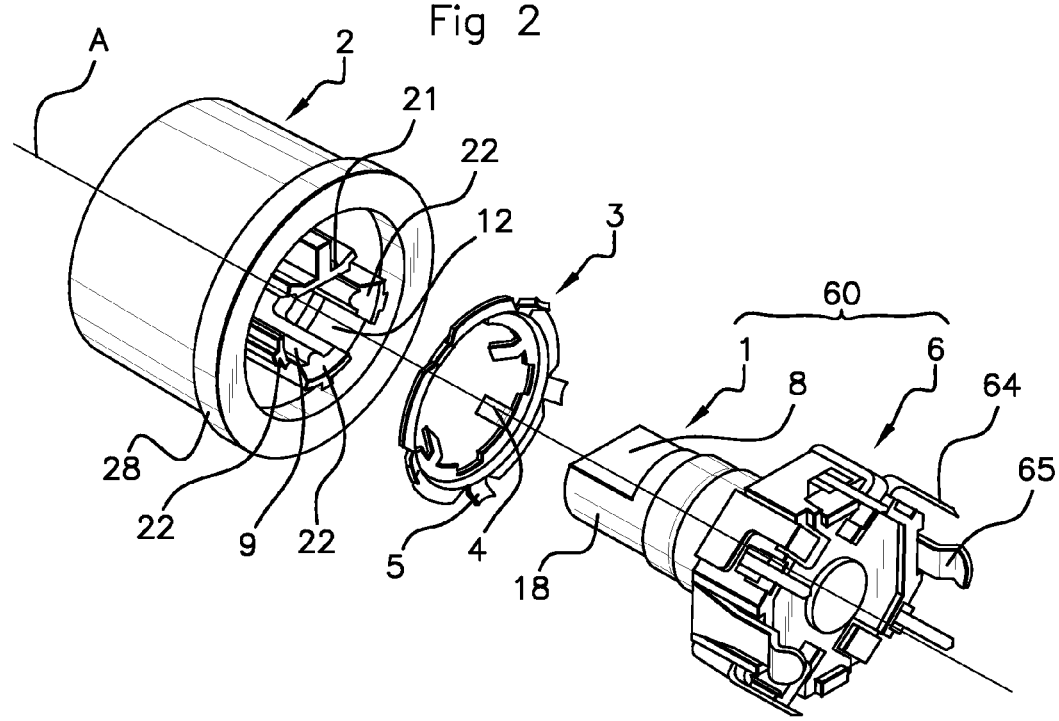
FIG. 2 is an exploded perspective view of the control device of FIG. 1.
Figure 5:
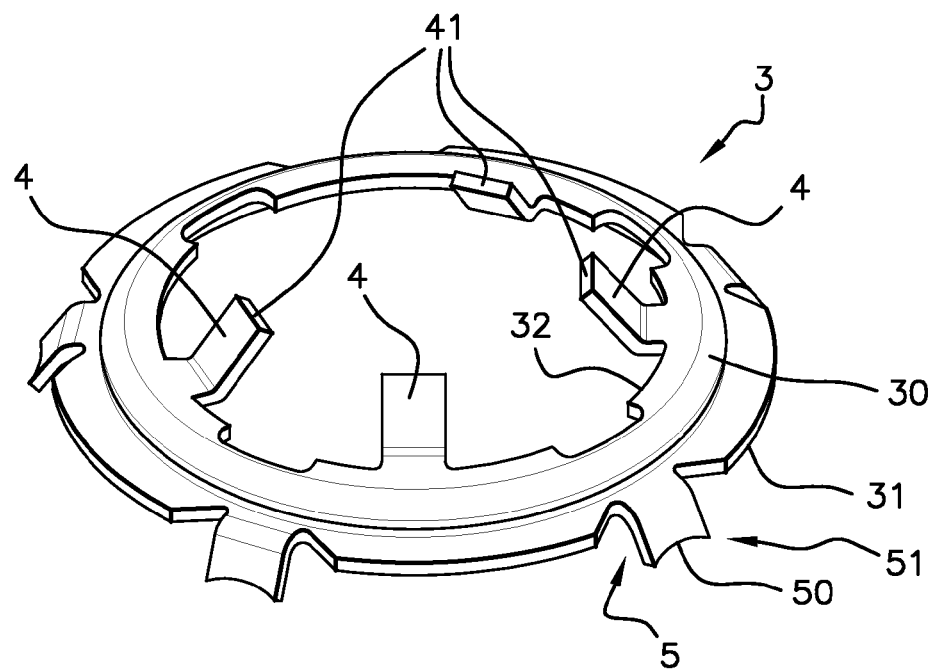
FIG. 5 is a perspective view of the anchoring ring.

The commutator 60 comprises a body 6 having a base 62 and a neck 61. On this body 6 there is mounted a control rod 1 (cf. FIG. 2). In the example illustrated, this is a mounting for rotation about the axis A with travel in the axial direction.

Generally, the control rod 1 is mounted with at least one degree of freedom which may be, for example, but not exclusively, a rotation about the axis A as in the case of an encoder or a rotary selector. The degree of freedom may also be a translation parallel with A, as in the case of a push-button. It is also possible to apply the invention to an assembly of the type involving a games joystick or games joystick roller wheel.

As can be seen in FIGS. 1 to 7, the commutator 60 comprises the control rod 1 which is mounted relative to the body 6. The base 62 is provided with assembly lugs 65 which are accommodated in holes of the electronic board 11 and which are used for positioning and retention prior to the welding of the electrical pins 64 to the lower face of the electronic board 11.

The control rod 1 in the example illustrated is in the form of a cylindrical rod in which a flattened zone 8 which is generally planar is provided.

A complementary peripheral zone 18 represents the circumferential complement of the flattened zone 8.

The above-mentioned button 2 comprises a gripping zone 27 with a generally bell-like shape and concave shapes at the outer surface, an axial recess 12 which is centered on the axis A. Furthermore, the button 2 comprises members for abutment with the control rod 1, including a first member 21 which abuts the flattened zone 8, and at least two second members 22 (in this instance, three second members 22) which abut the complementary peripheral zone 18 of the flattened zone 8.

A stud 9 protrudes toward the control rod 1; this stud 9 is slightly crushed when the button 2 is friction-mounted on the control rod 1 in order to ensure correct axial positioning of the button 2. Good coaxiality is thus ensured and occurrences of eccentricity are prevented when the button 2 is rotated.

An anchoring ring 3 is interposed between the button 2 and the control rod 1.

The anchoring ring 3 is produced from sheet metal which is cut and folded. it is possible in particular to select any steel which is suitable for fine cutting using a progressive tool.

The anchoring ring 3 comprises a ring body 30 which extends in a plane perpendicular to the axis A. The inner diameter 32 of the ring body 30 is greater than the outer diameter of the control rod 1, and the outer diameter 31 of the ring body 30 is smaller than the inner diameter of the bell-like member of the button 2.

Furthermore, the anchoring ring 3 comprises four first plates 4 which are directed counter to the body 6 and in an oblique manner in the direction of the axis A. These first plates 4 are resilient and each have a free end 41 which abuts the control rod 1.

Each of the first plates 4 is interposed circumferentially between one of the first and second members 21, 22, as can be seen in FIG. 3.

Furthermore, the anchoring ring 3 comprises five resilient lugs, in this instance five second plates 5, which are directed toward the body and which are orientated in an oblique manner in a direction away from the axis A, the resilient lugs abutting the button 2.

More specifically, as can be seen in FIG. 4, each second plate 5 pushes radially toward the outer side on an inner support 78 of the base 28 of the button 2. As a result of a sharp edge of the end 51, the second plate 5 acts in the manner of a harpoon in order to prevent a retraction movement of the button 2 relative to the anchoring ring 3.

According to a specific arrangement, the end 51 of the plate 5 may comprise a cutting burr, or may have a concave profile 50 (cf. FIG. 5) with two acute end tips (as illustrated) or sharp pins or small teeth (not illustrated). This type of arrangement improves the aggressive nature of the second plate 5 in order to promote the penetration and the anchoring in the skirt 78 of the button 2.

If a user attempts to remove the button 2, the traction force is transmitted by the second plates 5 to the anchoring ring 3. The force to which the anchoring ring 3 is subjected is transmitted to the control rod 1 using first resilient plates 4. These, as a result of the sharp edge of the end 41, abut the control rod 1 and make any retraction almost impossible, at least if it is desirable to remove the button 2 by hand.

Furthermore, the force applied by the first plates 4 has a tendency to press the button 2 against the flattened zone 8, which allows occurrences of eccentricity to be prevented when the button 2 is rotated under stress.

Figure 6:
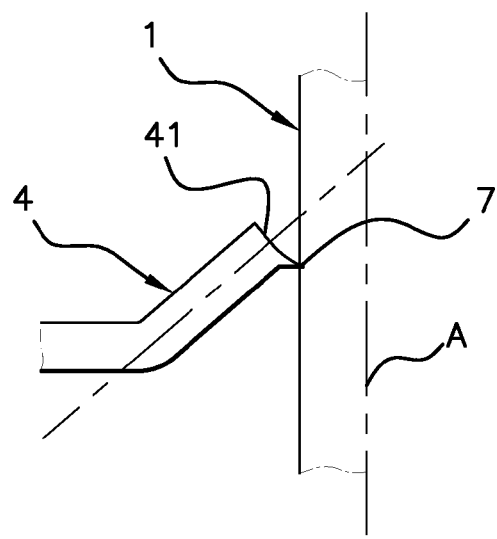
FIG. 6 shows a detail of the contact between the anchoring ring and the rod.

Advantageously according to an aspect of the invention, as illustrated in FIG. 6, the end 41 comprises a cutting burr 7 which promotes the penetration and the anchoring of the first resilient plate 4 in the outer surface of the control rod 1, which is of plastics material and which can therefore be penetrated by a metal element.

Figure 7:
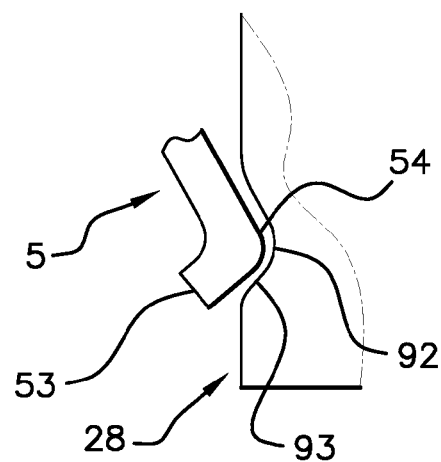
FIG. 7 shows a detail of the contact between the anchoring ring and the button according to an alternative production type.

According to an alternative set out in FIG. 7, the resilient lugs may be different from the plates with the harpoon effect mentioned above, and may in particular be clip-fit lugs. This is because, in this instance, the end 53 of each lug is curved toward the inner side and comprises a projection 54 which is received in a housing 92 which is arranged radially inside the skirt 78 of the bell-like member. In this manner, each end 53 presses on a support 93 of the button 2. In this instance, the disassembly of the button 2 is possible, with a significant force, this force being able to be adjusted by the appropriate selection of the abutment of the projection 54 and the depth of the housing 92.

Advantageously, the first resilient plates 4 may be provided as an even number (in the example illustrated, four) and are arranged symmetrically relative to a plane P2 which is normal relative to the flattened zone 8.

According to an optional aspect of the present invention, each first plate 4 is arranged circumferentially between two members (21, 22) of the button 2, which promotes the compactness in the axial direction A. The guiding and axial retention functions are thus interposed over the periphery of the control rod 1.

According to an optional aspect of the present invention, the control rod 1 is substantially smooth. Furthermore, the control rod 1 has a projection length E from the body of less than 7 mm, which allows a limited spatial requirement in the axial direction A, and/or a projection of the button 2 which is limited with respect to the facade wall 10.

Advantageously according to an aspect of the invention, the small projection of the button 2 with respect to the facade wall 10 enables compliance with the demands of the automotive industry referred to as ECE21 relating to the protection of the occupants in the event of an impact. Furthermore, the material of the gripping zone may be selected to have a hardness less than 50 Shore.

It should be noted that it would be possible to have a single first plate 4 arranged in a manner diametrically opposed to the flattened zone 8. It would also be possible to have more than four first resilient plates 4. In the same manner, the number of support members 21, 22 could differ from the example set out and may be any number.

It should also be noted that the button 2 may be monobloc or of two materials. In the case of dual material configuration, it is possible to select an elastomer compound for the gripping zone 27 and a harder plastics material for the base 28.

According to an optional aspect of the present invention, the axial recess 12 of the button 2 is blind, the gripping zone not having any edge or connection which could be unaesthetic.

It is not impossible for the button 2 to contain other functions, such as a light guide for light identification at the surface.

The method for assembling the commutation device is as follows:
  a. the anchoring ring 3 is inserted into the button 2, the second plates 5 sliding on the inner peripheral surface 78 of the bell-like member of the button 2 until the ring body 30 is in abutment against an inner abutment 79 of the button 2, the angular indexing being obtained by the fact that the first member 21 is wider than the gap between the second plates 5, which allows only one position,
  b. the assembly [comprising button 2 and anchoring ring 3] is inserted onto the control rod 1 of the commutator 60, a single position with orientation about the axis A being possible as a result of the presence of the flattened zone 8 (necessarily opposite the corresponding first member 21), the insertion being continued until the base 29 of the recess of the button 2 moves into abutment with the end 19 of the control rod 1.

During step b, the resilient plates slide along the control rod 1 and apply a force which is directed radially toward the axis A. A return toward the rear brings about the anchoring and the abutment of the first resilient plates 4 as described above.

According to the present invention, the commutator 60 is not necessarily an electrical commutator. It may be a mechanical commutator, for example, for controlling a cable.

The invention claimed is:

1. A control device, comprising:
   a commutator (60) which has a body (6) and a control rod (1) which extend along an axis (A), the control rod (1) being of plastics material and mounted at least with a degree of freedom relative to the body,
   a button (2) of molded plastics material which comprises an axial recess (12) having an axis (A) in which the control rod (1) is at least partially received,
   an anchoring ring (3) which is produced from sheet metal which is cut and folded and which is arranged around the control rod (1),
   first resilient plates (4) which are arranged on the anchoring ring (3) and which are directed counter to the body (6) and which are oblique in the direction of the axis (A), each plate (4) having a free end (41) in abutment with the control rod (1),
   resilient lugs (5) which are arranged on the anchoring ring (3) and which are directed toward the body and which are orientated in an oblique manner in a direction away from the axis (A), the resilient lugs (5) being in abutment with the button (2).

2. The control device as claimed in claim 1, wherein the resilient lugs (5) are second plates with a sharp edge.

3. The control device as claimed in claim 2, wherein the second plates (5) comprise pointed pins.

4. The control device as claimed in claim 1, wherein at least one of the free ends (41) of the first plates (4) comprises a cutting burr (7) which promotes the penetration of the plate (4) into the control rod (1).

5. The control device as claimed in claim 1, wherein the at least one degree of freedom is a rotation about the axis (A).

6. The control device as claimed in claim 1, wherein the first plates (4) and the resilient lugs (5) are alternated circumferentially.

7. The control device as claimed in claim 1, wherein the resilient lugs (5) are resilient clips which are received against a support portion (93) of the button (2).

8. The control device as claimed in claim 1, wherein the control rod (1) is substantially smooth and has a projection length (E) from the body of less than 7 mm.

9. The control device as claimed in claim 1, wherein the axial recess (12) of the button (2) is blind.

10. The control device as claimed in claim 1, wherein the commutator (60) is an electrical or electronic commutator which is configured to control the operation of one or more members of a motor vehicle by a user.

11. The control device as claimed in claim 2, wherein at least one of the free ends (41) of the first plates (4) comprises a cutting burr (7) which promotes the penetration of the plate (4) into the control rod (1).

12. The control device as claimed in claim 3, wherein at least one of the free ends (41) of the first plates (4) comprises a cutting burr (7) which promotes the penetration of the plate (4) into the control rod (1).

13. The control device as claimed in claim 2, wherein the at least one degree of freedom is a rotation about the axis (A).

* * * * *